United States Patent [19]
LaBarre

[11] Patent Number: 5,265,970
[45] Date of Patent: Nov. 30, 1993

[54] STRUT CONSTRUCTION

[75] Inventor: Berger A. LaBarre, Bethel, Conn.

[73] Assignee: Norco, Inc., Ridgefield, Conn.

[21] Appl. No.: 970,016

[22] Filed: Nov. 2, 1992

[51] Int. Cl.$^5$ ............................................. F16B 21/00
[52] U.S. Cl. ..................................... 403/108; 403/322
[58] Field of Search ................... 403/108, 107, 106, 4, 403/321, 322, 325, 327, 328; 248/407, 408; 285/23, 81, 315, 316

[56] References Cited

U.S. PATENT DOCUMENTS

| | | | |
|---|---|---|---|
| 3,367,689 | 2/1968 | McCarthy | 287/58 |
| 3,390,874 | 7/1968 | McCarthy | 267/69 |
| 3,442,541 | 5/1969 | Metz | 287/119 |
| 3,469,871 | 9/1969 | Betts | 287/119 |
| 4,014,467 | 3/1977 | Ferguson | 239/261 |
| 4,362,415 | 12/1982 | Metz et al. | 403/109 |
| 4,366,945 | 1/1983 | Blaustein | 251/149.6 |
| 4,453,449 | 6/1984 | Hollmann | 89/1.806 |
| 4,453,748 | 6/1984 | Ekman | 285/316 |
| 4,546,956 | 10/1985 | Moberg | 251/149.6 |
| 4,682,795 | 7/1987 | Rabushka et al. | 285/1 |
| 4,726,269 | 2/1988 | Erikson | 403/322 |
| 4,813,810 | 3/1989 | Suzuki | 403/322 |
| 4,960,344 | 10/1990 | Geisthoff et al. | 403/316 |
| 5,066,049 | 11/1991 | Staples | 285/80 |

Primary Examiner—Paula A. Bradley
Assistant Examiner—Erik R. Puknys
Attorney, Agent, or Firm—H. Gibner Lehmann; K. Gibner Lehmann

[57] ABSTRACT

A strut construction having outer and inner telescoping strut members capable of relative extending and collapsing movements. The outer strut member has a socket for a locking ball which is captive but moveable therein. A release collar is captive and slidable on the outer strut member between locking and release positions. The release collar has spaced-apart shallow and deep internal pockets for respectively receiving, depending on its locking or releasing position, portions of the captive ball of the outer strut member The inner strut member has a shoulder means which provides shallow and deep pockets to respectively receive other portions of the captive ball. The captive ball, socket of the outer strut member, and the shoulder means restrict movement of the release collar and restrict full telescoping collapsing movement of the strut members when the release collar is in its locking position wherein portions of the ball occupy the shallow pockets of the collar and shoulder means, and alternatively enable full telescoping collapsing movement of the strut members to be effected when the release collar is in its releasing position and portions of the ball occupy the deep pocket of the collar.

15 Claims, 2 Drawing Sheets

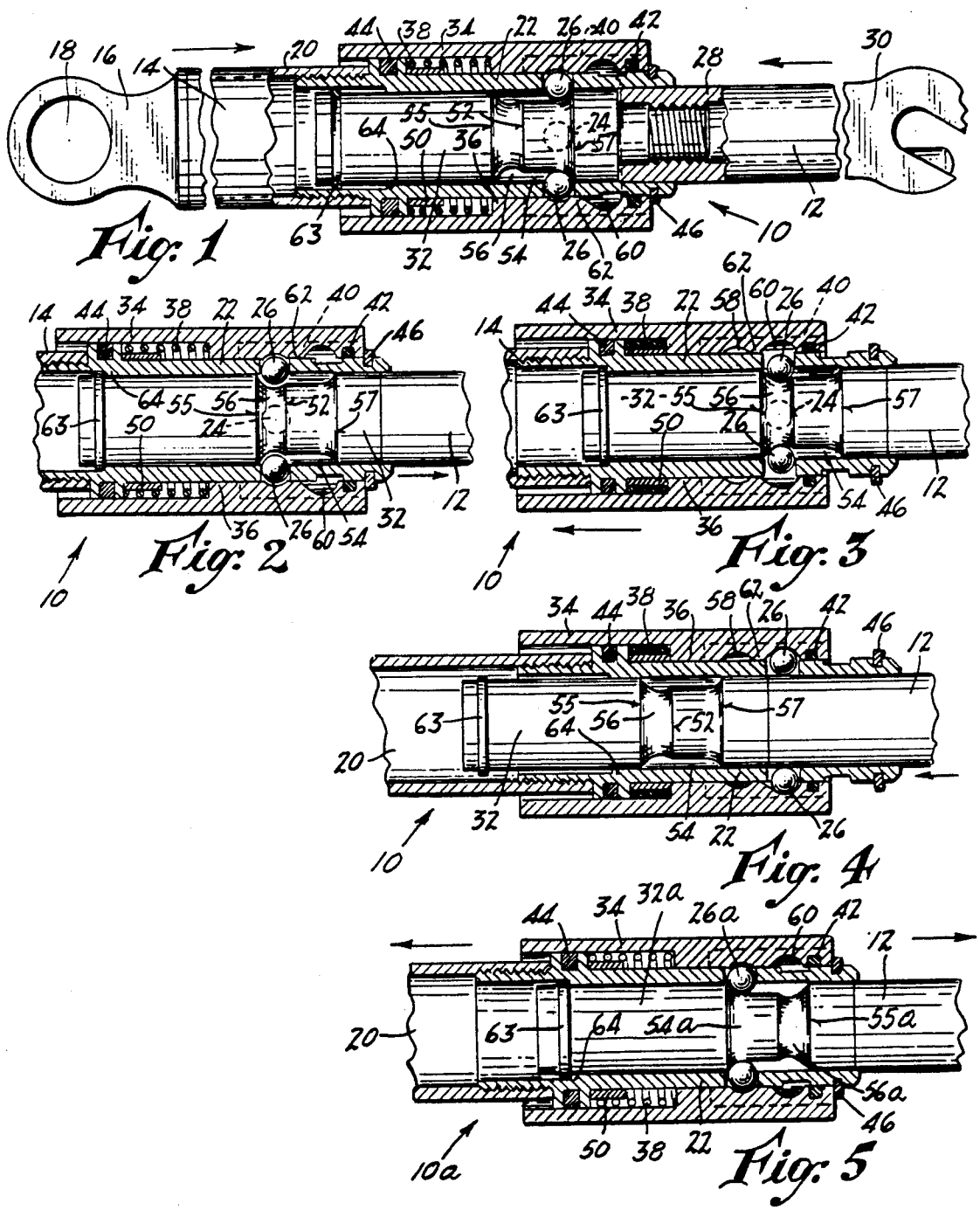

STRUT CONSTRUCTION

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates to collapsible strut constructions, and more particularly to such constructions wherein telescoping strut members are lockable in extended positions.

2. Description of the Related Art Including Information Disclosed Under 37 CFR §§1.97-1.99

The following prior art references are hereby cited as being of interest.

U.S. Pat. Nos.:

| | | |
|---|---|---|
| 3,367,689 | 3,390,874 | 3,442,541 |
| 3,469,871 | 4,014,467 | 4,362,415 |
| 4,366,945 | 4,453,449 | 4,453,728 |
| 4,546,956 | 4,682,795 | 4,960,344 |
| 5,066,049 | | |

U.S. Pat. No. 3,442,541, FIG. 1, discloses a releasable fastener in the form of a strut having telescoping inner and outer members, and a locking sleeve which is slidable on the outer member and which controls movement of locking dogs carried respectively in radial slots in the outer member. The inner member has a series of transverse locking ribs which are engaged by corresponding locking ribs on the dogs. With the locking sleeve in its locked position, the dogs are in forcible locking engagement with the ribs on the inner member. When it is desired to release the strut, the sleeve is shifted axially to a position wherein the locking dogs can shift outwardly in response to axial force applied between the telescoping members, and the latter can thereafter collapse into one another, as desired.

U.S. Pat. No. 3,469,871 illustrates a lockable coupling having telescoping inner and outer members and which employs two arcuate locking dogs carried in a circumferential groove of the inner member, and also employs multiple force-transmitting balls housed in radial slots of the inner member. Each arcuate locking dog is engaged by two balls. In operation, a release member or rod having a conical actuator portion engages the balls and shifts them radially, along with the arcuate locking dogs. During locking, the dogs are shifted laterally into inner annular grooves on the outer telescoping member. Locking and release of the telescoping members is accomplished by axially displacing the release member, via a pin-coupled release collar (64, FIG. 2) carried by the inner telescoping member.

Other constructions involving struts of the type employing radially shiftable locking components are illustrated in U.S. Pat. No. 3,390,874 and U.S. Pat. No. 3,367,689.

U.S. Pat. No. 4,362,415 illustrates a locking strut having a slidable locking collar which can be positively retained in a locking position by an external spring-biased locking lever.

Less pertinent is U.S. Pat. No. 4,546,956, which discloses a releasable coupling for a hose attachable to a supply of compressed gas. The arrangement is such that the coupling cannot be removed from the supply fitting until after the pressure is reduced, to minimize danger to personnel from an inadvertent, gas-propelled "fly off" of the coupling. Although this device provides a safety interlock feature, it is not a strut, and the structure and mode of operation of the device is different from that of the invention, as will be apparent hereinbelow.

U.S. Pat. Nos. 4,014,467; 4,366,945; 4,453,748; 4,682,795; and 5,066,049 all involve releasable hose fittings/-couplings having various types of locking structures that employ captive balls.

U.S. Pat. No. 4,960,344 discloses a coupling between a drive shaft and a driven shaft. U.S. Pat. No. 4,453,449 relates to a re-useable, non-destructive hold-down apparatus employing locking balls, which apparatus grips a member such as a missle or projectile, until a certain tension is developed by the same, and which thereafter releases the member suddenly.

In connection with those of the above patents dealing with struts, there existed significant problems involving inadvertent release under load. Specifically, with either compressive or tensile loads applied between the telescoping members of the prior art struts, there was a danger that the operator could slide the locking collar (or other release mechanism) to a release position while the strut was still under load, possibly leading to a sudden collapse of the strut and an accompanying uncontrollable swing or fall of the member being held, by virtue of its own weight. Such a condition was capable of causing serious injury to either the operator or to other personnel in the area.

In the past, struts of the type noted have been used with aircraft cowlings, in order to retain the cowlings in an open position as during maintenance and/or servicing of the aircraft engines. Depending on the size of the aircraft, such cowlings can weigh many hundreds of pounds, and the potential of injury resulting from being struck by an inadvertently released cowling can be readily appreciated if one considers structures of such magnitude and size.

SUMMARY OF THE INVENTION

The above disadvantages and drawbacks of prior locking strut constructions are obviated by the present invention, which has for one object the provision of a locking strut which positively resists release at such time as any load is applied between its telescoping inner and outer members, thereby requiring that an operator first manually (or with equipment) take control of the load between such members, and thereafter substantially completely remove such load, prior to manually shifting of a locking sleeve of the strut towards its release position.

A related object of the invention is to provide an improved locking strut as above characterized, wherein greatly improved safety of operation is realized, by elimination of the possibility of an operator being inadvertently struck by a falling structural component connected with the strut.

Still another object of the invention is to provide an improved locking strut in accordance with the foregoing, where the strut can be readily adapted, by means of a simple modification, to handle either compressive loads or tensile loads, thus providing maximum flexibility to an installation of a type incorporating such a strut.

Yet another object of the invention is to provide an improved strut as above set forth, which is both simple in its structure, and rugged and reliable over extended periods of use.

A still further object of the invention is to provide an improved strut of the kind indicated, wherein little or no maintenance or servicing is required over the life of the strut.

Yet another object of the invention is to provide an improved strut as outlined above, wherein the strut components can be readily fabricated and assembled, so as to keep the manufacturing costs as low as possible.

The above objects are accomplished by a strut construction comprising outer and inner telescoping strut members capable of relative extending and collapsing movements, the outer strut member having a socket and having a locking ball which is held captive in and which is moveable in the socket, and a release collar held captive and slidable on the outer strut member between locking and release positions. The collar has spaced-apart shallow and deep internal pockets for respectively receiving, depending on its locking or releasing position, portions of the captive ball, and there are shoulder means on the inner strut member, having shallow and deep pockets to respectively receive other portions of the captive ball. The captive ball, socket of the outer strut member, and shoulder means restrict movement of the release collar and also restrict full telescoping collapsing movement of the strut members when the release collar is in its locking position due to portions of the ball occupying the shallow pockets of the collar and shoulder means, and alternatively enabling full telescoping collapsing movement of the strut members to be effected when the release collar is in its releasing position and portions of the ball occupy the deep pocket of the collar. The shoulder means enables a limited relative movement of the strut members to be had, thereby to free the ball for movement into the deep pocket of the shoulder means and thus enable the release collar to be shifted from its locking position to its release position for permitting collapse of the strut construction.

The objects are further accomplished by a strut construction comprising outer and inner telescoping strut members capable of relative extending and collapsing movements, the outer strut member having a socket in which a locking ball is captive and moveable, and a release collar held captive and slidable on the outer strut member between locking and release positions. The collar has spaced-apart shallow and deep internal pockets for respectively receiving, depending on its locking or releasing position, portions of the captive ball, and there are shoulder means on the inner strut member, having shallow and deep pockets to respectively receive other portions of the captive ball. The captive ball, socket of the outer strut member, and shoulder means restrict movement of the release collar and also restrict full telescoping collapsing movement of the strut members when the release collar is in its locking position and portions of the ball occupy the shallow pockets of the collar and shoulder means, and alternatively enable full telescoping collapsing movement of the strut members to be effected when the release collar is in its releasing position and portions of the ball occupy the deep pocket of the collar.

The arrangement is such that prior to release of the locking collar, the load on the strut, be it tensile or compressive, must first be manually removed by the operator and thereafter the strut momentarily extended or retracted a short distance, as by grasping and moving one of the components being held by the strut, following which the release collar can be manually slid toward a releasing position under the condition of essentially zero load on the strut members.

Significantly improved operational safety is realized, since the operator cannot inadvertently slide the release collar toward a release position unless the load on the strut has first been essentially completely removed, and the strut members thereafter moved slightly in a direction, with respect to one another, which is opposite to that of the said load.

Other features and advantages will hereinafter appear.

BRIEF DESCRIPTION OF THE DRAWINGS

FIG. 1 is a fragmentary view, partly in side elevation and partly in axial section, of the improved locking strut of the present invention, illustrating telescoping inner and outer strut members having applied thereto a compressive load, and showing locking balls and a release collar having an internal shallow pocket and an internal deep pocket, the release collar being disposed in its locked position.

FIG. 2 is a view like FIG. 1, except with the load having been removed from the strut, and showing the strut members thereafter extended by a short distance wherein a deep pocket in the inner member is brought to a position registering with the locking balls, and in preparation for sliding of the release collar.

FIG. 3 is a view like FIGS. 1 and 2, except showing the locking balls mostly occupying the deep pocket and wherein the release collar has been manually shifted toward the left with respect to the outer strut member.

FIG. 4 is a view like FIGS. 1-3, except showing the locking balls displaced radially outward and occupying the deep pocket in the release collar, the balls slidably engaging the outer cylindrical surface of the inner strut member.

FIG. 5 is a view like FIGS. 1-4, except illustrating a modified strut construction of a type adapted for use with tensile forces applied respectively to telescoping inner and outer strut members.

DESCRIPTION OF THE PREFERRED EMBODIMENT

Figure 6:
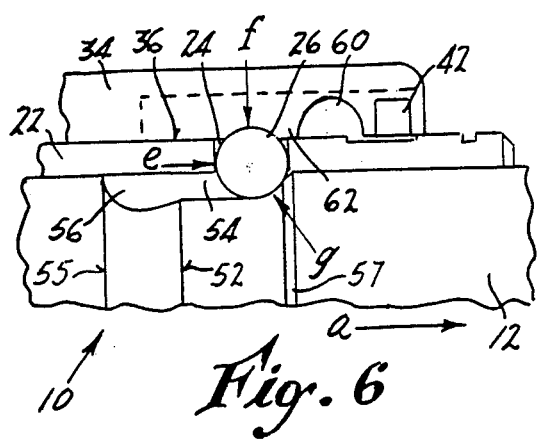
FIG. 6 is an enlarged diagrammatic representation of the strut of FIGS. 1-4, showing one locking ball held captive in a radial slot of the outer strut member, and showing a camming shoulder of a shallow pocket of the inner strut member urging the ball radially outward into forcible engagement with the internal shallow pocket of the release collar.

Referring first to FIGS. 1 and 6 there is illustrated an extendable and collapsible strut construction generally designated by the numeral 10, comprising an inner strut member 12 and an outer strut member 14, the inner member 12 being adapted to telescope into the outer member 14 in the usual manner during collapse of the strut 10.

The outer member 14 is shown as comprising a bearing end fitting 16 having a hole 18 to receive a suitable bearing member or pin (not shown), and comprising a tubular body part 20 and a cage 22 having an external thread which mates with corresponding internal threads of the body part 20. This cage has four circumferentially spaced holes 24, FIGS. 1 and 6, which respectively carry and hold captive four locking balls 26, two of which are shown in FIG. 1 in solid outline, and one of which is shown in dotted outline.

The inner strut member 12 comprises a tubular part 28 having at its one end, a clasp fitting or coupling 30, shown as being of a type having an oblique pin-receiving slot and retractable locking dog. At its inner end, the inner strut member 12 has a threaded locking adapter or fitting 32, screwed into the adjacent end of the tubular part 28.

Slidably carried on the outer strut member 14 is a tubular release collar or release member 34 having a cylindrical bearing portion 36 which is adapted for sliding engagement with the corresponding cylindrical surface of the cage 22. A spiral compression spring 38 is disposed between the release collar 34 and the outer strut member 14, to normally bias the collar 34 toward the right in FIG. 1. The release collar alternatively can have a collar insert 40, shown in dotted outline in FIGS. 1-4, and there is an internal annular recess in the release collar 34 that carries a sealing member 42, to prevent ingress of dust or foreign matter to the area between the outer strut member 14 and the release collar. A second seal 44 is provided, carried in an external annular recess of the cage 22 of the outer strut member 14. The release collar 34 is held captive on the outer strut member 14 by a retaining ring 46 snapped into a groove in one end, and by the spring 38. A stop spacer 50 is optionally provided, carried on the outer strut member 14 and inside the spring 38, to limit the extent of travel of the release collar 34 in one direction and also avoid overcompression of the spring. A snap ring 63 engaging a shoulder 64 constitutes a stop for the members 12 and 14.

In accordance with the present invention there is provided on the inner strut member 12 and on the release collar 34, a new combination involving cooperable structures which effectively transmit to the release collar 34, load or force which is applied between the inner and outer strut members 12, 14, and which structures operate to forcibly retain the collar 34 against any axial movement with respect to the outer strut member 14, until such time as the load between the strut members 12, 14 is essentially completely removed. In accomplishing this retention of the release collar 34, there are provided on the outer surface of the inner strut member 12 a shoulder means 52 formed between a shallow pocket 54 and a deep pocket 56, the shallow pocket 54 extending axially for a somewhat greater distance measured along the inner strut member 12. There are also provided on the release collar 34, a shallow internal pocket 58 in the form of an annular internal groove, and a deep internal pocket 60 also in the form of an annular internal groove, displaced axially from the shallow internal pocket 58 of the collar 34. Separating the pockets is an annular internal shoulder 62. The pockets can be formed in the collar insert 40 if such is used, which is first machined as a separate piece, and then pressed into an end recess in the body of the release collar 34. Depending on the locking or release condition of the strut, the four balls 26 become seated in various ones of the pockets 54, 56, 58, 60 in order to achieve the desired locking or release function.

In the embodiment shown in FIGS. 1-4, the strut 10 is of a type which is extendable to a predetermined length, and thereafter locked in an extended position. The extended strut is especially adapted to remain locked so long as a compressive load is applied between the outer strut member 14 and the inner strut member 12. The retaining ring 63 carried on the inner strut member 12 constitutes a stop means, and limits the extent of travel of the inner strut member by its engagement with the internal shoulder in the cage 22.

In describing the operation of the improved strut of the present invention, reference is initially made to FIGS. 1-4, and FIGS. 6-9. In FIGS. 1 and 6, the strut is in a locked condition, wherein the inner and outer strut members 12, 14, respectively are almost fully extended. As shown, the balls 26 occupy the holes 24 in the cage 22, and the shallow pocket 54 of the inner strut member 12 is in engagement with the balls 26. The balls 26 also engage the shallow internal pocket 58 of the release collar 34. By the invention, a compressive force applied between the outer and inner strut members 14, 12 respectively causes the balls 26 to be cammed or urged radially outwardly into forcible engagement with the walls of the shallow internal pocket 58 of the release collar 34. Under such circumstances, the release collar 34 is held fast against inadvertent axial movement, and more particularly against any such movement toward the left in FIG. 1, with respect to the outer strut member 14. As long as the compressive load remains applied, the release collar 34 is immovable, and it is this feature of immovability of the release collar 34 which gives rise to the improved safety of operation of the strut as compared to known arrangements. Stated differently, with known prior strut constructions, a slide or release collar was normally capable of being axially shifted, whether intentional or inadvertent, in the presence of load applied to the strut members. Where the load was considerable, a sudden collapse of the strut could occur, and possibly cause serious injury to the operator.

Figure 9:
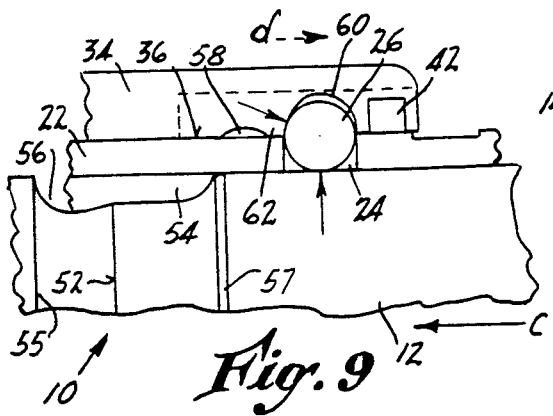
FIG. 9 is an enlarged diagrammatic representation like FIGS. 6-8, except showing the inner strut member having been collapsed, and wherein the ball has been shifted radially outward, by virtue of its engagement with the smooth cylindrical surface of the inner strut member, to a position occupying the deep internal pocket of the release collar. The release collar remains in this unlocking position even following manual release thereof.
Figure 8:
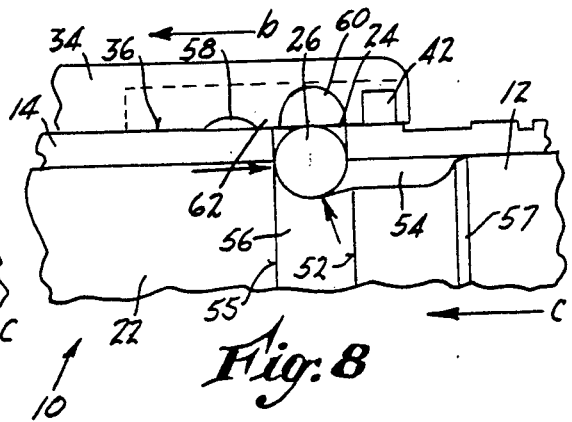
FIG. 8 is an enlarged diagrammatic representation like FIGS. 6 and 7, except showing the ball seated in the deep pocket of the inner strut member. The release collar has been manually shifted axially toward the left with respect to the outer strut member, to its unlocking position and held there. The ball registers with the deep internal pocket of the release collar.

In contrast, with the present invention, the release collar 34 cannot be moved, either intentionally or accidentally, until the load is first removed from members 12 and 14, and thereafter the members manually extended with respect to one another by a short distance. More particularly, with reference to FIGS. 2 and 7, the first step in unlocking the strut is to remove the load, which is done manually by the operator, by grasping one of the load-generating components (not shown) to which the strut is attached and applying the necessary force to relieve the compression. Then, the strut members 12, 14 are manually extended a short distance with respect to one another, as in FIGS. 2 and 7, so as to axially align the deep pocket 56 of the inner strut member 12 with the balls 26, which in effect provides a clearance space in the inner strut member 12 into which the balls 26 can be moved as the release collar 34 is shifted. Since the balls 26 no longer occupy the shallow pocket 58, the release collar 34 is freed, and the operator, with his other hand, shifts the collar 34 toward the left as in FIGS. 3 and 8, wherein the deep internal pocket 60 of the release collar 34 overlies the balls 26. In FIGS. 4 and 9, following partial manual collapse of the strut members, the balls become disposed between the walls of the internal deep pocket 60 of the release collar 34 and the smooth cylindrical surface of the part 28 of the inner strut member 12. From this position, the inner strut member 12 can be further moved toward the left, to a fully collapsed condition (not shown).

In order to effect subsequent extension of the strut, the inner strut member 12 is manually withdrawn from the outer strut member 14, past the relative positions of FIG. 4, until the deep pocket 56 of the inner strut member 12 underlies the balls 26. At this time, the balls 26 are shifted radially inwardly under the action of the spring-biased release collar 34, which can now snap to the right, FIG. 2, wherein the shallow internal pocket 58 of the release collar 34 overlies the balls 26. The inner strut member 12 then is collapsed slightly until the shoulder 52 of the inner strut member 12 underlies the balls, the parts ultimately being returned to the relative positions shown in FIG. 1. The strut is now locked in an extended position, and can accept compressive loads. As long as there is a compressive force applied between the outer and inner strut members, the release collar remains forcibly restrained against any axial movement as a consequence of an applied force to the collar, whether intentional or inadvertent.

The disclosed construction has been assigned by the applicant, the acronym "NULU", which stands for "no unlock under load".

The improved strut as set forth above has the important advantage of providing significantly improved safety of operation. As noted previously, where such a strut is employed to hold an aircraft cowling in a raised position, as during inspection or servicing of an aircraft engine, the strut of the present invention prevents inadvertent release or slipping of the cowling. In particular, in order to lower the cowling to its operative position, the operator must first grasp it and apply to the strut, a force opposite in direction to that applied by the cowling, and thereafter extend the strut by a slight distance; while holding the cowling, the operator then slides the release collar, with his other hand, toward its release position and then slowly lowers the cowling to collapse the strut. In other words, the operator must take control of the load before the release collar can be shifted to unlock the strut. The deliberation required by the operator in carrying out this sequence of steps, involving first taking control of the load and then shifting the release collar to its unlocking position while still holding the load, is considered to be highly significant from the standpoint of safety, and reliable operation.

Another embodiment of the invention is illustrated in FIG. 5, wherein components corresponding to those of FIGS. 1-4 have been designated with the same reference numerals, and modified components assigned like reference numerals with the suffix "a" applied.

In FIG. 5, the relative positions of the shallow and deep pockets 54a, 56a, respectively in the locking adapter 32a of the inner strut member 12 have been reversed from the positions of FIGS. 1-4. Specifically, the construction illustrated in FIG. 5 is intended for use with tensile loads applied between the inner and outer strut members 12, 14.

In accordance with the present invention there is provided on the inner strut member 12 and on the release collar 34, a new combination involving cooperable structures which effectively transmit to the release collar 34, load or force which is applied between the inner and outer strut members 12, 14, and which structures operate to forcibly retain the collar 34 against any axial movement with respect to the outer strut member 14, until such time as the load between the strut members 12, 14 is essentially completely removed. Assuming in FIG. 5 that there exists a tensile load between the strut members 12, 14, the balls 26a are forcibly engaged with the surface of the shallow pocket 58 of the release collar 34. Specifically, the shoulder 62 between the pockets 58, 60 positively prevents axial shifting of the release collar 34, particularly toward the left in FIG. 5, because the balls 26a are held in radially outward positions by the inner strut member 12, and the balls 26a lie in the line or path of travel that the shoulder 62 would normally take were the release collar 34 to be moved toward the left, i.e. toward its releasing position. The balls 26a thus block the shoulder 62 in the manner of a locking bolt of a door latch. Before the strut can be unlocked from this extended position, it is necessary to first remove the tensile load between the strut members 12, 14, and thereafter slightly collapse the members by a small distance, wherein the deep pocket 56a of the inner strut member 12 underlies the balls 26a (corresponding to FIGS. 2 and 7 of the first embodiment). Due to the clearance space for the balls that is provided by the deep pocket 56a of the inner strut member 12, the balls 26a can be shifted inwardly by moving the release collar 34 toward the left in FIG. 5, to the position wherein the deep pocket 60 of the release collar 34 overlies the balls 26a (corresponding to FIGS. 3 and 8 of the first embodiment). Then, with the release collar 34 held in its release position, the inner strut member 12 can be telescoped into the outer strut member 14 (corresponding to FIGS. 4 and 9 of the first embodiment), with the balls 26a slidably engaging the smooth cylindrical surface of the inner strut member 12 as the telescoping movement occurs.

Subsequent extension of the strut of FIG. 5 is accomplished by merely forcibly extending the inner strut member 12 (moving it toward the right in FIG. 5) with respect to the outer strut member 14, until the shallow pocket 54a of the inner member 12 arrives at the position of FIG. 5. As the deep pocket 56a of the inner strut member 12 passes beneath the balls 26a, it provides a clearance space for the balls 26a and enables them to be momentarily shifted inwardly sufficiently to allow the spring-biased release collar 34 to spring toward the right, i.e. toward the locking position shown in FIG. 5. The retention ring 63 engaging the shoulder 64 prevents extension of the strut beyond a certain point, as in the previous embodiment.

In other respects the operation of the embodiment of FIG. 5 is the same as that of the first embodiment.

Referring now again to the diagrammatic showings of FIGS. 6-9, the relative positions of the components of the embodiment of FIGS. 1-4 are shown in greater detail. In accordance with the present invention, the balls are never manually engaged, nor are they engaged by any springs. The forces acting on any ball 26 for various conditions of the strut are diagrammatically shown in FIGS. 6-9, by means of arrows whose heads touch on the ball. FIG. 6 is the equilibrium or locked condition of the strut. Other arrows in the figures designate movement of strut components, either manually or under spring action. In FIG. 6, the arrow "a" indicates that the strut member 12 is about to be moved to the right. Thereafter, in FIG. 7, the arrow "b" indicates that the release collar 34 is about to be moved to the left, this releasing movement having been completed in FIG. 8, as also indicated by the arrow "b"; the manual force on the collar 34 is maintained as per the arrow "b", and the arrow "c" in this figure indicates that the strut member 12 is about to be moved to the left. In FIG. 9 the strut member 12 has been moved part way to the left, as per arrow "c", and manual force has been removed from the collar 34, which now is under spring pressure indicated by the broken-line arrow "d".

Figure 7:
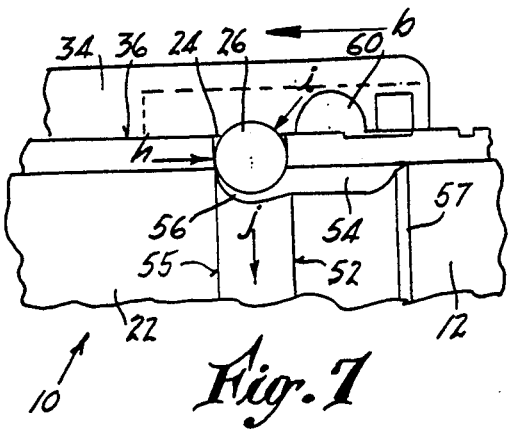
FIG. 7 is an enlarged diagrammatic representation like FIG. 6, except showing a manual extension of the inner and outer strut members as permitted by the compressive load thereon having been removed, such that the inner strut member can be moved so that its deep pocket registers with one locking ball and provides clearance for the ball to move radially inward during manual shifting of the release collar.

FIG. 6 illustrates the equilibrium or locked condition of the strut. The arrows "e", "f" and "g" are the forces nominally present on the ball 26 when the ball is locked against movement. In FIG. 7 two arrows "h" and "i" are shown, which move the ball 26 as indicated by the arrow "j". The ball 26 now shifts to the position in FIG. 8, where the strut member 12 can be moved to the left while the collar 34 is being held to the left against the action of its spring 38. In carrying out the initial part of this movement, the strut member 12 shifts the ball 26 laterally to the position of FIG. 9 and the strut member 12 is no longer restrained by the ball 26.

From the above it can be seen that I have provided a novel and improved locking strut which features significant advantages in safety of operation, while being straightforward in operation, and rugged and reliable in use even over extended period of time. There are not required any special tools on the part of the operator; nor are there required special knowledge or skills in order to safely and effectively operate the strut.

The disclosed device is thus seen to represent a distinct advance and improvement in the field of extensible and collapsible struts.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A strut construction comprising, in combination:
   a) outer and inner telescoping strut members capable of relative extending and collapsing movements, said outer strut member having a socket and having a locking ball which is held captive in and which is moveable in the socket,
   b) a release collar held captive and strut member between locking and release positions, said collar having spaced-apart shallow and deep internal pockets for respectively receiving, depending on its locking or releasing position, portions of said captive ball, and
   c) shoulder means on the inner strut member, having shallow and deep pockets to respectively receive other portions of said captive ball,
   d) said captive ball, socket of the outer strut member, and shoulder means restricting movement of the release collar and restricting full telescoping collapsing movement of the strut members when the release collar is in its locking position wherein portions of the ball occupy the shallow pockets of the collar and shoulder means, and alternatively enabling full telescoping collapsing movement of the strut members to be effected when the release collar is in its releasing position and portions of the ball occupy the deep pocket of the collar,
   e) said shoulder means enabling a limited relative movement of the strut members to be had, thereby to free the ball for movement into the deep pocket of the shoulder means and thus enable the release collar to be shifted from its locking position to its release position for permitting collapse of the strut construction.

2. A strut construction as set forth in claim 1, wherein:
   a) said shoulder means enables limited relative movement of the strut members to be had.

3. A strut construction as set forth in claim 1, wherein:
   a) said limited relative collapsing movement of the strut members to be had.

4. A strut construction as set forth in claim 1, wherein:
   a) the outer strut member has a plurality of sockets and balls respectively moveable in and held captive in said sockets,
   b) said outer strut member having a tubular cage containing said sockets.

5. A strut construction as set forth in claim 1, wherein:
   a) said shoulder means comprises a fitting which is attached to the inner strut member.

6. A strut construction as set forth in claim 1, wherein:
   a) spring means are provided, biasing said release collar to its locking position.

7. A strut construction comprising, in combination:
   a) outer and inner telescoping strut members capable of relative extending and collapsing movements, said outer strut member having a socket in which a locking ball is captive and moveable,
   b) a release collar held captive and slidable on the outer strut member between locking and release positions, said collar having spaced-apart shallow and deep internal pockets for respectively receiving, depending on its locking or releasing position, portions of said captive ball, and
   c) shoulder means on the inner strut member, having shallow and deep pockets to respectively receive other portions of said captive ball,
   d) said captive ball, socket of the outer strut member, and shoulder means restricting movement of the release collar and restricting full telescoping collapsing movement of the strut members when the release collar is in its locking position and portions of the ball occupy the shallow pockets of the collar and shoulder means, and alternatively enabling full telescoping collapsing movement of the strut members to be effected when the release collar is in its releasing position and portions of the ball occupy the deep pocket of the collar.

8. A strut construction as set forth in claim 4, wherein:

a) the release collar has annular internal grooves constituting the said internal pockets.

9. A strut construction as set forth in claim 4, wherein:
a) the shoulder means has exterior annular grooves constituting the said shallow and deep pockets of said means.

10. A strut construction as set forth in claim 4, wherein:
a) the release collar has annular internal grooves constituting the said internal pockets,
b) said shoulder means having exterior annular grooves constituting the said shallow and deep pockets of said means.

11. A strut construction as set forth in claim 1, wherein:
a) the outer and inner strut members have cooperable stop means limiting the relative movement of the members to extended position.

12. A strut construction as set forth in claim 1, wherein:
a) the release collar and the outer strut member have cooperable sealing means adjacent the ends of the collar, preventing ingress of foreign matter to the collar.

13. A strut construction comprising, in combination:
a) outer and inner telescoping strut members capable of relative movement between extended and collapsed positions, said outer strut member having a socket and having a locking ball which is held captive in and which is moveable in the socket,
b) a release collar held captive and slidable on the outer strut member between locking and release positions, said release collar having an inwardly projecting shoulder adjacent to the socket, and
c) camming shoulder means on said inner strut member, normally holding said locking ball in a radially outward position in said socket to block the shoulder of said collar and prevent releasing movement of the collar when the strut members are in extended position and under load, said camming shoulder means releasing said ball for radially inward movement in said socket in response to relative movement of said strut members in a direction in opposition to the load thereon, thereby to unblock the release collar.

14. The invention as set forth in claim 13, wherein:
a) said locking ball blocks the shoulder of said collar in the manner of a locking bolt.

15. A strut comprising, in combination:
a) outer and inner strut members having extending and collapsing movements, the outer strut member having a socket,
b) a locking piece captive and moveable in the socket, and
c) a release member movable on the strut between locking and releasing positions, said release member having means to provide a shallow and a deep pocket for respectively receiving, depending on its locking or releasing position, a portion of said locking piece,
d) said inner strut member having a shallow and a deep pocket to respectively receive another portion of said locking piece,
e) said locking piece, socket of the outer strut member, and shallow pocket of the inner strut member restricting movement of the release member and restricting collapsing movement of the strut members when the release member is in its locking position wherein portions of the locking piece occupy the shallow pockets of both the release member and inner strut member, and alternatively enabling full collapsing movement of the strut members to be effected when the release member is in is releasing position and portions of the locking piece occupy the deep pocket of the release member,
f) said pockets of the inner strut member enabling a limited relative movement of the strut members to be had for the purpose of freeing the locking piece for movement into the deep pocket of the inner strut member so as to enable the release member to be shifted from its locking position to its releasing position for permitting collapse of the strut.

* * * * *